United States Patent [19]

Kim

[11] Patent Number: 4,649,472

[45] Date of Patent: * Mar. 10, 1987

[54] MULTI-PHASE SUBROUTINE CONTROL CIRCUITRY

[75] Inventor: Dongsung R. Kim, Laguna Hills, Calif.

[73] Assignee: Burroughs Corporation, Detroit, Mich.

[ * ] Notice: The portion of the term of this patent subsequent to Aug. 21, 2001 has been disclaimed.

[21] Appl. No.: 589,298

[22] Filed: Mar. 14, 1984

Related U.S. Application Data

[62] Division of Ser. No. 231,554, Feb. 4, 1981, Pat. No. 4,467,410.

[51] Int. Cl.[4] .............................................. G06F 9/30
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,568,158 | 3/1971 | Haller et al. | 364/200 |
| 3,614,740 | 10/1971 | Delagi et al. | 364/200 |
| 3,725,868 | 4/1973 | Malmer, Jr. et al. | 364/200 |
| 3,909,797 | 9/1975 | Goss et al. | 364/200 |
| 3,972,029 | 7/1976 | Bailey, Jr. | 364/200 |
| 4,041,462 | 8/1977 | Davis et al. | 364/200 |
| 4,156,900 | 5/1979 | Gruno et al. | 364/200 |
| 4,156,925 | 5/1979 | Tatt et al. | 364/200 |
| 4,173,782 | 11/1979 | Dixon | 364/200 |
| 4,197,579 | 4/1980 | Otis, Jr. et al. | 364/200 |
| 4,229,790 | 10/1980 | Gilliland et al. | 364/200 |
| 4,384,324 | 5/1983 | Kim et al. | 364/200 |
| 4,486,831 | 12/1984 | Wheatley et al. | 364/200 |

OTHER PUBLICATIONS

*Computer*, May 1977, D. M. Bulman, "Stack Computers", pp. 14–19.

*Primary Examiner*—Eddie P. Chan
*Attorney, Agent, or Firm*—Nathan Cass; Kevin R. Peterson; Edmund M. Chung

[57] ABSTRACT

Multi-phase subroutine control apparatus for use in a data processing system which provides for the concurrent execution of a plurality of tasks in a multiprogramming and multiprocessing environment. Subroutine control operations are staged so as to share common hardware in a manner which in effect provides a plurality of phased concurrently operating subroutine control circuits wherein each circuit provides control for a different one of a plurality of concurrently executing tasks. The common subroutine hardware includes a multi-level stack for each task and a fast access return address register which permits a return address to be rapidly made available when required during execution of a task.

5 Claims, 6 Drawing Figures

MULTI-PHASE SUBROUTINE CONTROL CIRCUITRY

CROSS-REFERENCE TO RELATED PATENT APPLICATIONS

This is a division of application Ser. No. 231,554, filed Feb. 4, 1981, now U.S. Pat. No. 4,467,410, issued Aug. 21, 1984.

The commonly assigned patent applications Ser. No. 147,149, filed May 6, 1980, for Pipelined Microprogrammed Digital Data Processor Employing Microinstruction Tasking, D. R. Kim and J. H. McClintock, inventors, and Ser. No. 147,251, filed May 6, 1980, now U.S. Pat. No. 4,384,324, issued May 17, 1983, for Microprogrammed Digital Data Processing System Employing Tasking at a Microinstruction Level, D. R. Kim and J. H. McClintock, contain subject matter related to this application.

My commonly assigned application Ser. No. 231,553, filed Feb. 4, 1981, now U.S. Pat. No. 4,459,659, issued July 10, 1984, for Subroutine Control Circuitry is also related to this application.

INTRODUCTION

The present invention relates generally to improved means and methods for performing data processing operations in a digital data processing system, and more particularly to improved means and methods for controlling subroutine operations in a multiprogramming and multiprocessing environment.

BACKGROUND AND SUMMARY OF THE INVENTION

In the aforementioned patent applications, an embodiment of a microprogrammed data processing system is disclosed which provides for the execution of tasks in a manner so as to achieve the advantages of both multiprogramming and microprocessing of tasks at a microinstruction level. One object of the present invention is to provide improved means and methods for controlling subroutine operations in a system of this type.

A more general object of the present invention is to provide improved subroutine control means and methods in a data processing system.

An additional object of the invention is to provide multi-phase subroutine control circuitry in a data processing system which can accommodate many levels of subroutine entry and which provides for sharing subroutines among a large plurality of instructions and/or tasks.

In a particular preferred embodiment, the invention is adapted for incorporation in a data processing system of the type disclosed in the aforementioned patent applications wherein a plurality of tasks are concurrently performed in a manner so as to provide for the multiprogramming and multiprocessing of tasks at a microinstruction level. In the preferred embodiment of the present invention, a particularly advantageous subroutine control capability is provided using a plurality of selectably accessible stacks, one for each task, along with corresponding pointer registers. Also, a relatively faster access register is provided for storing the most recent return address of each task so as to permit return addresses to be rapidly made available when required. Operation is provided in a manner which permits multiple levels of subroutine entry to be accommodated for each task, while also permitting many tasks to share the same subroutines. In addition, subroutine control operations are staged for performance in a multiprogramming and multiprocessing environment so as to be able to provide multi-phase subroutine control for a plurality of concurrently executing tasks.

The specific nature of the invention as well as other objects, features, advantages and uses thereof will become evident from the following detailed description of the invention taken in conjunction with the accompanying drawings.

DESCRIPTION OF A PREFERRED EMBODIMENT

Like numerals and characters represent like elements throughout the figures of the drawings.

For the purposes of this description, a preferred embodiment of the subroutine control circuitry of the present invention will be described for an implementation which is specifically adapted for incorporation in a data processing system of the type disclosed in the aforementioned patent applications. However, it is to be understood that the subroutine control capability provided by the present invention can also be implemented for use in other types of systems.

Figure 1:
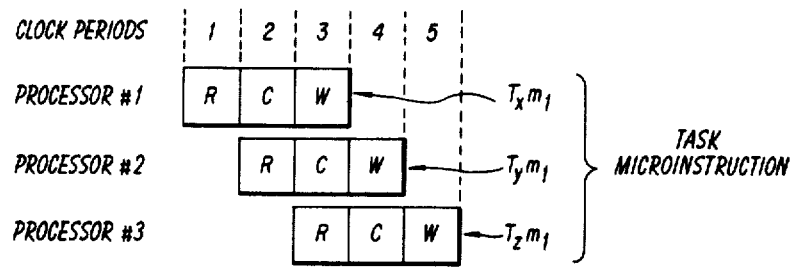
FIGS. 1 and 2 illustrate examples of the operation of the system disclosed in the aforementioned patent applications.
Figure 2:
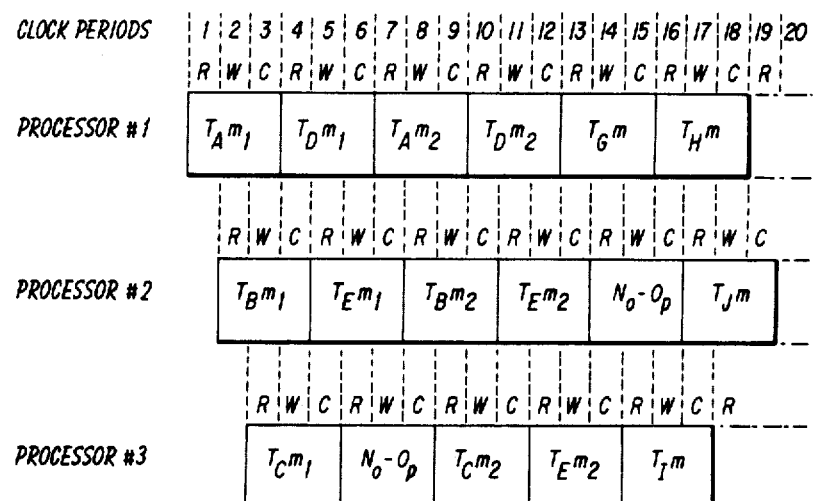

Brief Description of the Preferred Embodiment Disclosed in The Aforementioned Patent Applications (FIGS. 1 and 2)

In order to better understand the detailed description of the preferred embodiment of the subroutine control circuitry to be presented herein, a brief description of pertinent portions of the system disclosed in the aforementioned patent applications will first be provided. The full disclosures of these patent applications are to be considered as incorporated herein.

In the preferred embodiment of the data processing system disclosed in the aforementioned patent applications, high level input instructions are viewed as a plurality of tasks to be performed. Each task is divided into one or more task microinstructions. Execution of each task microinstruction is performed over three stages (Read, Compute and Write), each stage requiring one clock. Multiprogramming is achieved by providing for the performance of task microinstructions in an intermixed fashion regardless of the task to which each task microinstruction belongs. Multiprocessing is achieved by employing a three-stage pipelined architecture in a manner which in effect performs as three separate processors operating 120° out of phase with one another and sharing the same physical hardware. During each clock period, each processor executes a different one of the Read, Computer and Write stages corresponding to a different task microinstruction. In other words, during each clock period, a Read operation is capable of being performed for a first task microinstruction, a Compute operation is capable of being performed for a second task microinstruction, and a Write operation is capable of being performed for a third task microinstruction.

FIGS. 1 and 2 illustrate examples of the operation of the system disclosed in the aforementioned patent applications. FIG. 1 basically illustrates how three 120° out-of-phase processors provide for the concurrent performance of the three task microinstructions $T_Xm$, $T_Ym$, and $T_Zm$. The letters R, C and W in FIG. 1 respectively designate the three successive Read, Write and Compute stages performed in executing each task microinstruction. Typical 3-stage operation of a task microinstruction in the system of the aforementioned applications is as follows.

During the first stage, a Read operation is performed to prepare for execution of a particular selected task microinstruction. This includes reading out from storage the appropriate operand data to be used during microinstruction execution, reading out condition select data for use in determining the next microinstruction address, and decoding appropriate fields of the microinstruction to derive control signals for use in controlling data path functions during the next following Compute stage.

In this next following Compute stage, a Compute operation is performed during which the selected microinstruction is executed. Also, selected conditions (determined by the condition select data read out during the Read stage) are used to produce next microinstruction data.

In the next following Write stage, which is the last stage in the execution of a task microinstruction, a Write operation is performed during which the results of microinstruction execution are written into storage. Also, the next microinstruction data produced during the Compute stage is used to select the next microinstruction.

FIG. 2 is an example of how the system disclosed in the aforementioned patent applications provides for the execution of task microinstructions in a manner which takes advantage of both multiprogramming and multiprocessing. This example in FIG. 2 illustrates the concurrent performance of the three calculations: $(A+B)+(C+D)=H$; $(A+B)-E=I$; and $(C+D)-E=J$. The ten tasks $T_A$ through $T_J$ are characterized as follows:

| Tasks | Operators |
|---|---|
| $T_A = T_Am_1$ w $T_Am_2$ | VALC A |
| $T_B = T_Bm_1$ w $T_Bm_2$ | VALC B |
| $T_C = T_Cm_1$ w $T_Cm_2$ | VALC C |
| $T_D = T_Dm_1$ w $T_Dm_2$ | VALC D |
| $T_E = T_Em_1$ w $T_Em_2$ | VALC E |
| $T_F = T_Fm$ | ADD (A + B) = F |
| $T_G = T_Gm$ | ADD (C + D) = G |
| $T_H = T_Hm$ | SUBTRACT F − G = H |
| $T_I = T_Im$ | SUBTRACT F − E = I |
| $T_J = T_Jm$ | SUBTRACT G − E = J |

It is assumed for the above example that the "operand fetch" tasks $T_A$-$T_E$ each require two task microinstructions with at least a three clock wait period (indicated by "w" above) therebetween. It is also assumed that each of the "ADD" and "SUBTRACT" tasks $T_F$-$T_J$ require only one clock period (indicated above and in FIG. 2 by "m" having no subscript). Also note in FIG. 2 that a "No-Op" microinstruction is indicated when no task microinstruction is performed.

Description of a Preferred Embodiment of the Present Invention (FIGS. 3–6)

It will be remembered from the above brief description of the preferred embodiment of the data processing system disclosed in the aforementioned applications that, during a Compute operation, a particular task microinstruction is executed and also next microinstruction data is produced. The preferred embodiment of the present invention is concerned with the situation where this next microinstruction data indicates that the next task microinstruction to be executed for this task is the first task microinstruction of a subroutine. When such is the case, the next microinstruction data not only provides the address of the first microinstruction of the subroutine, but also provides a subroutine entry signal E along with a signed offset value F. This signed offset value F has a value such that the return microinstruction address for the subroutine is obtainable by adding this signed offset value F to the address of the present microinstruction PA. During the Compute stage of the last microinstruction of a subroutine, the system provides a return signal R requesting that the appropriate return address be provided for use as the next microinstruction address.

Figure 3:
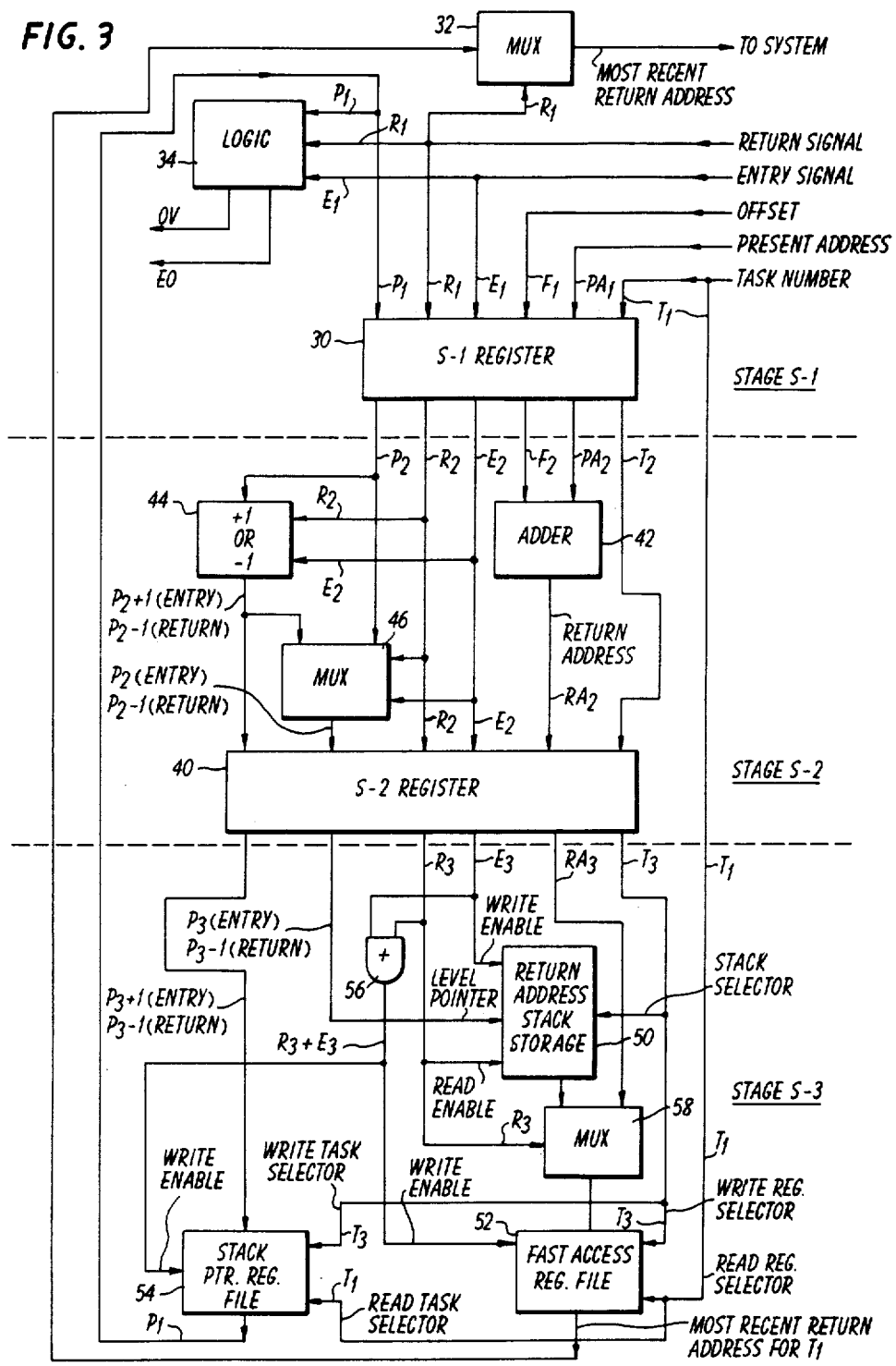
FIG. 3 is a preferred implementation of multi-level subroutine control circuitry in accordance with the invention.

FIG. 3 illustrates a preferred implementation of multi-level subroutine control circuitry adapted for use in the system of the aforementioned patent applications. Before describing this implementation in detail, a functional description of its overall operation will first be presented in order to permit the detailed description to be more easily understood.

The entry signal E provided by the system when a subroutine is to be entered causes the subroutine control circuitry of FIG. 3 to add the signed offset value F to the present microinstruction address PA to form the return address RA. This calculated return address RA is then stored in a stack corresponding to the task which produced the entry signal E (there being one such stack for each task), and the stack level pointer is incremented by one and saved in a respective register. Typically, each stack may accommodate, for example, fifteen levels of subroutine entry so that as many as fifteen return addresses can be stored in the corresponding stack for each task.

Provision is also made for the most recent return address in each stack to be separately stored in a corresponding fast access register so that it can be rapidly provided to the system for use as a next microinstruction address when a subroutine return is required. It will be remembered that a subroutine return is initiated when the system provides a return signal R during a Compute stage of task execution. This return signal causes the separately stored most recent return address for the task to be sent to the system and to be replaced in this separate storage by the next most recent return address for that task. Also, the corresponding stack pointer for the task is decremented by one to reflect that this most recent return address has been sent to the system.

The above summarized subroutine control operations of the preferred implementation illustrated in FIG. 3 are performed in three stages which operate in synchronism with the previously described three-stage Read, Compute and Write operations of the system disclosed in the aforementioned patent applications so as to be able to take advantage of, as well as contribute to, the multiprogramming and multiprocessing capabilities of this system as illustrated in FIGS. 1 and 2. More specifically, the preferred subroutine control circuitry illustrated in FIG. 3 is constructed and arranged in a manner so as to in effect provide three separate subroutine control circuits operating 120° out of phase with one another with each circuit providing subroutine control for a different task.

Figure 4:
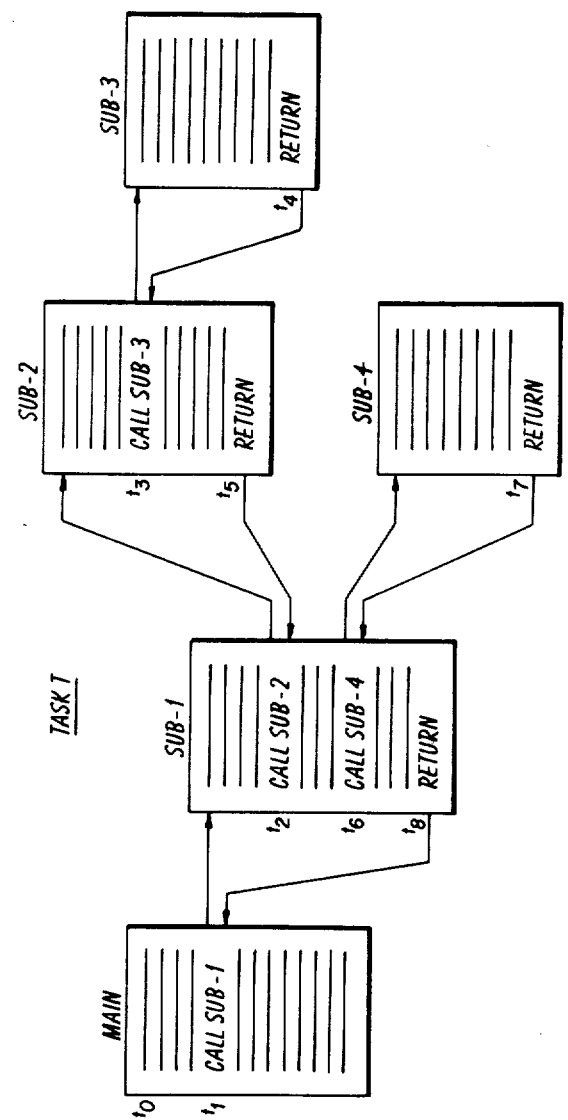
FIG. 4 illustrates an example of a typical task listing containing a plurality of subroutine calls.
Figure 5:
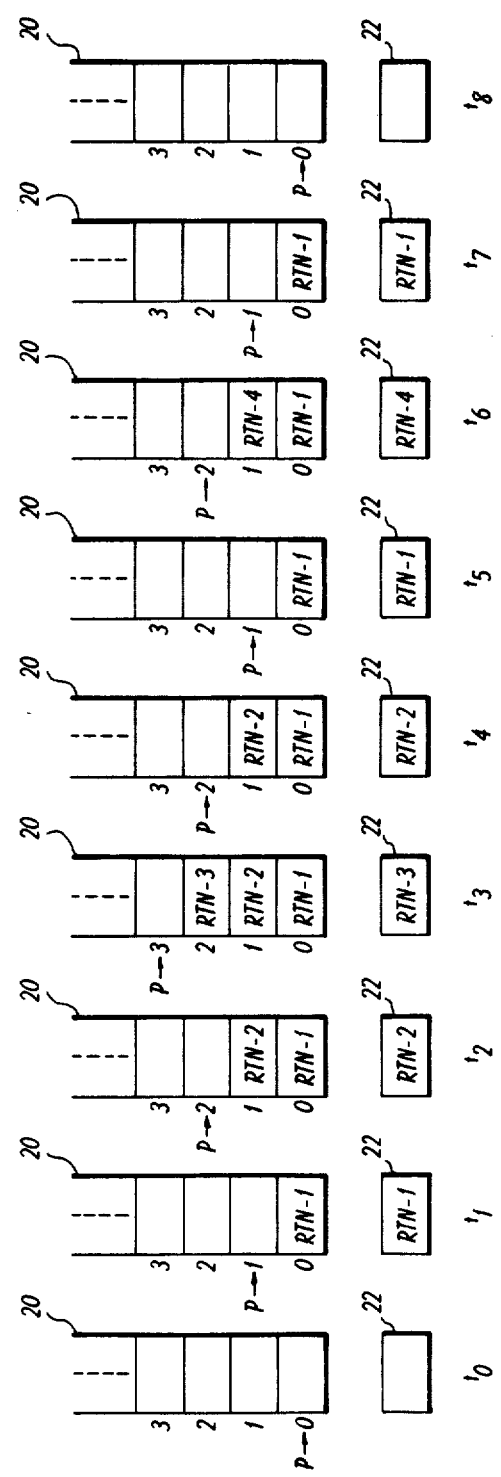
FIG. 5 illustrates basic operations of the FIG. 3 implementation during performance of the task of FIG. 4.

Reference is now directed to the example of FIGS. 4 and 5. FIG. 4 illustrates a task T which, for example, includes four subroutine calls SUB-1, SUB 2, SUB-3 and SUB-4. FIG. 5 illustrates the contents of the return address stack 20 and fast access register 22 for task T at particular time periods $t_0$-$t_8$ during performance of the task.

As indicated in FIG. 4, task T comprises a main portion and three subroutine calls SUB-1, SUB-2, SUB-3 and SUB-4. At the beginning of task T (time $t_0$), the stack 20 and the fast access return address register 22 are empty, and the stack pointer P points to level 0. When SUB-1 is encountered at time $t_1$, the corresponding return address RTN-1 for SUB-1 is calculated and stored in the stack 20 and also in the fast access register 22 (FIG. 5). The stack pointer P is decremented by 1 to point to level 1 so as to indicate that level 1 is the next available stack location.

As illustrated in FIG. 4, during the performance of SUB-1, SUB-2 is encountered at time $t_2$. As indicated for $t_2$ in FIG. 5, the return address RTN-2 for SUB-2 is calculated and stored at level 2 in stack 20 and the pointer P is incremented by 1 to point to level 2. RTN-2 also replaces RTN-1 in the fast access register 22, since RTN-2 is now the most recent return address.

During the performance of SUB-2, a third subroutine SUB-3 is encountered at time $t_3$ which now causes a third return address RTN-3 to be calculated and placed in level 2 of stack 20 and also in the fast access register 22, as shown for $t_3$ in FIG. 5. Also, the pointer P is incremented by 1 to now point to level 3. When SUB-3 is completed at time $t_4$ (FIG. 4), the corresponding return address RTN-3 is rapidly accessed from the fast access register 22 and is replaced by the next most recent return address RTN-2 from the stack 20, as indicated for time $t_4$ in FIG. 5. Also note for $t_4$ in FIG. 5 that, since a return is performed, pointer P is decremented by one to point to level 2. It will be understood that the return address RTN-3 may still reside in level 2, but this is of no significance since it will be written over if level 2 receives another return address. Accordingly, for clarity, level 2 is shown empty for $t_4$ in FIG. 5. This convention is used throughout FIG. 5.

As illustrated in FIG. 4, after completion of SUB-3 at $t_4$, SUB-2 continues and is completed at $t_5$. The corresponding return address RTN-2 in the fast access register 22 is thus accessed and replaced by the next most recent address RTN-1, and the pointer P is decremented by 1 to point to level 1, as indicated at $t_5$ in FIG. 5.

At time $t_6$, SUB-4 is encountered (FIG. 4) which, as shown for $t_6$ in FIG. 5, causes the corresponding calculated return address RTN-4 to be placed in stack 20 at level 1 and also to be placed in the fast access register 22; the pointer P is incremented to point to level 2. When SUB-4 is completed at $t_7$ (FIG. 4), the return address RTN-4 is accessed from the fast access register 22 and is replaced by the next most recent return address RTN-1, as shown for $t_7$ in FIG. 5, while the pointer P is decremented by 1 to point to level 1.

As shown in FIG. 4, SUB-1 then continues and is completed at $t_8$, at which time RTN-1 is accessed from the fast access register 22 and processing returns to the main portion of task T. Accordingly, as illustrated for $t_8$ in FIG. 5, stack 20 and the fast access register 22 are now empty and the pointer P is pointing to level 0.

As pointed out earlier herein, the subroutine control operations provided by the preferred implementation illustrated in FIG. 3 are staged in a manner so as to in effect provide three separate subroutine control circuits operating 120° out of phase with one another with each circuit providing subroutine control for a different task. Accordingly, it is to be understood that, in the preferred implementation of FIG. 3, the operations for the illustrative task T described above in conjunction with FIGS. 4 and 5 may be performed concurrently, but 120° out of phase with one another, for up to three different tasks. This is accomplished by providing three successive stages S-1, S-2 and S-3 (one clock per stage) for the performance of the subroutine control operations required in response to a subroutine entry or in response to a subroutine return for a particular task. In addition, provision is made to perform all three stages S-1, S-2 and S-3 during a single clock period in a manner so that, during each clock period, each of stages S-1, S-2 and S-3 performs its respective subroutine operations for a different task.

It is also to be noted that these subroutine control stages S-1, S-2 and S-3 perform their respective operations in synchronism with the Compute, Write and Read stages, respectively, of the system of the aforementioned patent applications which system was briefly described in connection with FIGS. 1 and 2. Such operation is illustrated in FIG. 6 which is a generally similar type of illustration as FIG. 1 with the additional showing of the corresponding subroutine control stages S-1, S-2 and S-3 occurring during particular illustrative examples of subroutine entry and return for each task.

Figure 6:
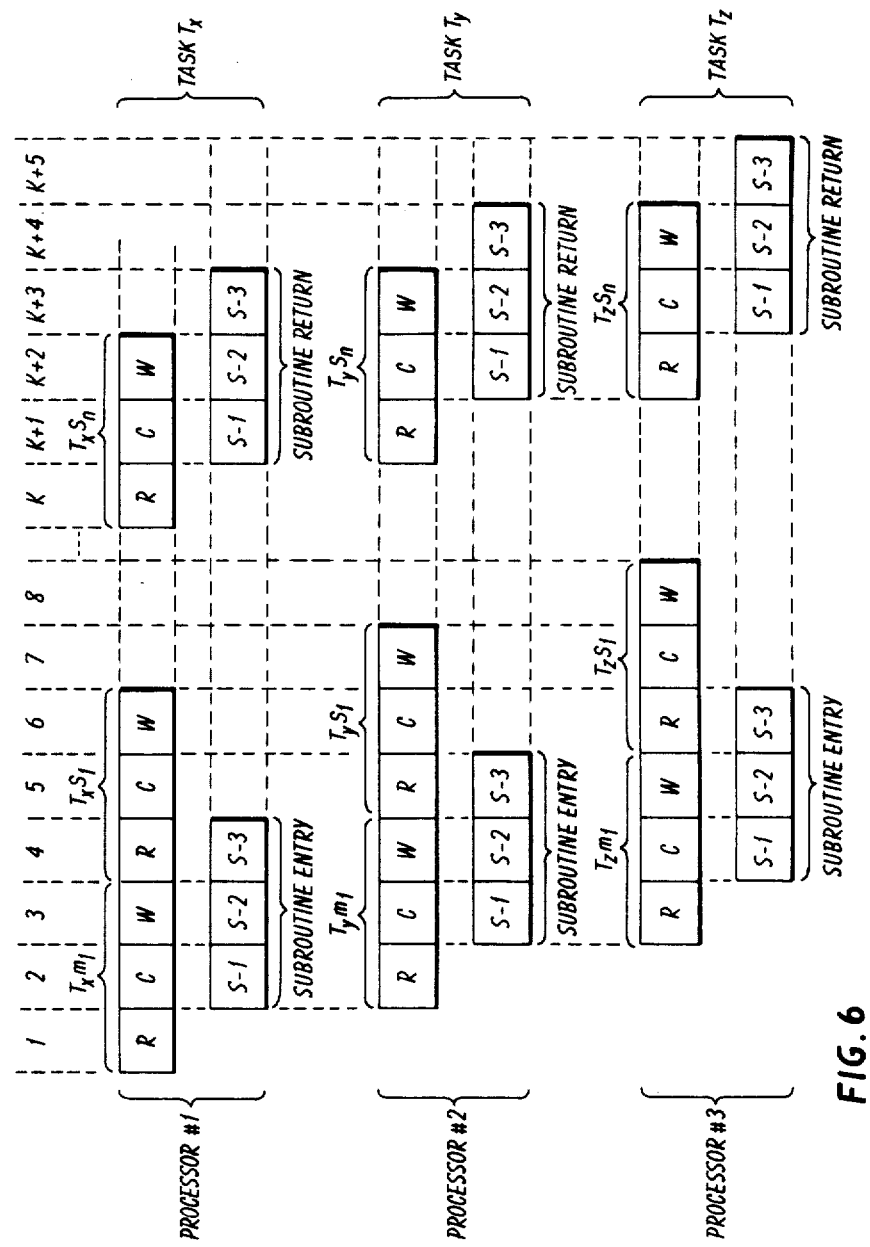
FIG. 6 illustrates time relationships between the performance of the stages of the subroutine control circuitry of FIG. 3 and the stages of the processor system.

More specifically, FIG. 6, similar to FIG. 1, illustrates the concurrent performance of tasks $T_x$, $T_y$ and $T_z$ by processors #1, #2 and #3, respectively, operating 120° out of phase with one another. For the purposes of the preferred embodiment of the present invention being described herein, it is assumed as an example that the first illustrated task microinstructions $T_x m$, $T_y m$, and $T_z m$, of tasks $T_x$, $T_y$ and $T_z$, respectively, in FIG. 6, each provide a subroutine entry signal during its Compute (C) operation indicating that the next task microinstruction for the respective task ($T_x s_1$, $T_y s_1$ or $T_z s_1$) is to be the first microinstruction of a particular subroutine. Accordingly, during the Compute stage (C) of each of microinstructions $T_x m_1$, $T_y m_1$ and $T_z m_1$, subroutine operations comprised of stages S-1, S-2 and S-3 are initiated for each task in response to a subroutine entry signal E provided by the system during the corresponding Compute operation. As a result, the corresponding return address for each task is calculated and stored in its respective stack 20 and fast access register 22 and the respective stack level pointer P is incremented as previously described in connection with FIGS. 4 and 5 (note, for example, time period $t_1$). Then, during the last task microinstruction of each subroutine (as indicated in FIG. 6 by task microinstructions $T_x s_n$, $T_y s_n$ and $T_z s_n$), subroutine operations comprised of stages S-1, S-2 and S-3 are again initiated in response to a subroutine return signal R provided by the system during the corresponding Compute operation, causing the corresponding return address in the respective fast access register 22 to be transmitted to the system for use as the next microinstruction address for its respective task, while also causing the corresponding stack level pointer P to be decremented and the next most recent return address (if present) to be stored in the fast access register 22 (note, for example, time period $t_4$ in FIGS. 4 and 5).

It is, of course, to be understood that the subroutine entry and return operations shown for exemplary purposes in FIG. 6 may occur independently for each processor and need not occur at the particular times indicated. The particular times illustrated in FIG. 6 are instructive, however, in demonstrating how subroutine control operations may typically be performed concurrently for up to three tasks in the preferred implementation being described herein, and also in synchronism with corresponding Compute, Write and Read operations of the system.

DETAILED DESCRIPTION OF FIG. 3

In the light of the above general and functional descriptions, the preferred subroutine control circuitry illustrated in FIG. 3 will now be considered in detail by describing the structure and operations provided for each of stages S-1, S-2 and S-3. In this regard, it should be remembered that, in the preferred implementation, each stage is performed during one clock period, and that during a single clock period, each stage may be performing its operations for a different task. For example, note clock period 4 in FIG. 6 during which an S-1 operation is performed for task $T_x$, an S-2 operation is performed for task $T_y$, and an S-3 operation is performed for task $T_z$.

Stage S-1

As illustrated in FIG. 3, stage S-1 includes an S-1 register 30, a multiplexer 32, and logic 34. The S-1 register 30 serves to store the subroutine signals provided during the compute operation of a task microinstruction when either a subroutine entry or subroutine return situation is indicated. If a subroutine entry is indicated, the subroutine signals designate the following: a task number $T_1$ (which is also applied to stage S-3), a present address $PA_1$, a signed offset value $F_1$, the next available stack level indicated by pointer $P_1$ (which is provided by stage S-3 in response to $T_1$), and a subroutine entry signal $E_1$.

If a subroutine return is indicated, the subroutine signals provided designate just the task number $T_1$, the next available stack level indicated by pointer $P_1$ (provided by stage S-3), and a subroutine return $R_1$. As will be considered later during the description of stage S-3, the task number $T_1$ applied to stage S-3 causes the most recent return address for the task to be applied to the input of the multiplexer 32; the return signal $R_1$ applied to the multiplexer 32 during S-1 of a subroutine return then causes this return address to be transmitted to the system for use as the next microinstruction address for this task.

Stage S-1 also includes logic 34 to which $E_1$, $R_1$ and $P_1$ are applied. When $E_1$ is present, logic 34 determines if the respective stack level pointer $P_1$ is at its highest level; if so, an overflow signal OV is produced indicating that the respective stack for task $T_1$ is full and cannot accept another return address. When $R_1$ is present, logic 34 determines if the respective stack level pointer $P_1$ is at its lowest level; if so, a signal OE is produced indicating that the respective stack for $T_1$ is empty. The system may then take appropriate action in response to an OV or EO signal.

Stage S-2

Stage S-2 includes an S-2 register 40, an adder 42, an incrementer/decrementer 44 and a multiplexer 44. It will be noted in FIG. 3 that the subscripts of the signals provided to stage S-2 are changed from "2" to "1". This is done to indicate that these signals which were applied to stage S-1 during the previous clock period are now being applied to stage S-2 in the next clock period. These "2" subscripts also serve to distinguish these signals applied to S-2 from the new set of subscript "1" signals which are concurrently applied during the same clock period to stage S-1 for a different task, as previously explained in connection with FIG. 6 (see, for example, clock period 3 in FIG. 6). A similar convention is used in connection with signals applied to S-3.

During stage S-2 of a subroutine entry, the return address $RA_2$ for the respective task is calculated by the adder 42 by adding the present address $PA_2$ to the offset value $F_2$. This calculated return address $RA_2$ is then stored in the S-2 register 40 along with the respective task number $T_2$ and the entry signal $E_2$. In addition, the entry signal $E_2$ produced for subroutine entry causes the incrementer/decrementer 44 to increment the pointer $P_2$ by one and also causes the multiplexer 46 to output the unchanged $P_2$ value, these values of $P_2$ and $P_2+1$ also being stored in the S-2 register 40.

During stage S-2 of a subroutine return, only $P_2$, $R_2$ and $T_2$ are present. Operation during S-2 is then such that $R_2$ causes the incrementer/decrementer 44 to decrement $P_2$ by one and to also cause the multiplexer 46 to pass the resulting $P_2-1$ value for storage in respective locations in the S-2 register 40 along with $R_3$ and $T_2$.

Stage S-3

As illustrated in FIG. 3, stage S-3 includes a return address stack storage 50, a fast access register file 52, a stack pointer register file 54, an OR gate 56 and a multiplexer 58. The return address stack storage 50 comprises a random access memory which provides storage for a plurality of stacks, one for each task. A single one of these stacks is illustrated by the stack 20 in FIG. 5. The fast access register file 52 provides rapidly accessible storage for a plurality of fast access registers, a single one of these registers being illustrated by the register 22 in FIG. 5. The stack pointer register file 54 provides storage for a plurality of stack level pointer registers, also one for each task.

The return address stack storage 50 is capable of being enabled during each clock period either for writing (for a subroutine entry) or for reading (for a subroutine return). Accordingly, $E_3$ serves as a write enable for storage 50 and $R_3$ serves as a read enable. The fast access register file 52 and the stack pointer register file 54 are capable of providing both writing and reading from different registers during each clock period. This capability is provided for files 52 and 54 in order to permit all three of the subroutine stages S-1, S-2, and S-3 to be performed during each clock period for different tasks as illustrated, for example, in FIG. 6. Reading is always provided during a clock period, while writing is enabled by either $E_3$ or $R_3$. This is implemented in FIG. 3 by applying the $E_3+R_3$ output of OR gate 56 to the write enable inputs of files 52 and 54. $T_3$ serves as a stack selector for the return address stack storage 50, and as a write register selector for both the fast access register file 52 and the stack pointer register file 54. $T_1$ serves as a read select register for both files 52 and 54. The level pointer for the return address stack storage is $P_3$ for a subroutine entry or $P_3-1$ for a subroutine return.

During stage S-3 of a subroutine entry, $E_3$ provides a write enable for the return address storage 50 so as to cause the return address $RA_3$ (calculated during S-2) to be written into the particular stack selected by task $T_3$ at the level pointed to by pointer $P_3$. This return address is also written, via multiplexer 58, into the particular fast access register in file 52 selected by $T_3$ (see, for example, FIG. 5, time $t_1$) The operation of the multiplexer 58 is such that, during a subroutine entry (when $R_3$ is absent), the multiplexer 58 passes $RA_3$ rather than the output of the return address stack storage 50. Also during S-3 of a subroutine entry, the incremented level pointer $P_3+1$ is written into the particular stack pointer register in file 54 selected by $T_3$.

During stage S-3 of a subroutine return, operations differ from those performed for a subroutine entry primarily in that there is no return address to be written in the return address stack storage 50. Instead, the storage 50 is enabled for reading by $R_3$. In such a case, $T_3$ still selects the stack in storage 50 and the register in file 52 which are to be accessed, but the stack level pointer will now have a value of $P_3-1$ (as a result of being decremented by one during S-2) so as to read out the next most recent return address for task $T_3$ which passes, via the multiplexer 58, to the fast access register file 52 for writing in the corresponding fast access register of $T_3$ (see FIG. 6, e.g., time $t_2$). Also during stage S-3 of a subroutine return, the decremented level pointer $P_3-1$ is written into the stack pointer register of file 54 selected by $T_3$ in order to adjust the level pointer value to account for the reading out from storage 50 of the next most recent return address.

It will be understood that, concurrently with the writing during stage S-3 of a return address in the particular fast access register of file 52 selected by $T_3$, the task number $T_1$ applied to stage S-1 during the same clock period is also applied to file 52 of stage S-3 to select a corresponding fast access register for reading out the most recent return address for $T_1$. As explained previously in connection with stage S-1, this accessed return address is applied to the multiplexer 32 of stage S-1 for transmission to the system in the event that a subroutine return is indicated for stage S-1.

It will also be understood that, concurrently with the writing during stage S-3 of a level pointer value in the particular register in the stack pointer register file 54 selected by $T_3$, the task number $T_1$ applied to stage S-1 during the same clock period is also applied to file 54 of stage S-3 to select a corresponding stack pointer register for reading out the current value of the level pointer for task $T_1$ for use as the $P_1$ value for the concurrently performed stage S-1 operations.

Although the description provided herein has been directed to a particular preferred embodiment, it is to be understood that many modifications and variations in structure, arrangement, operation and use are possible without departing from the inventive contributions disclosed herein. Accordingly, the present invention is to be considered as embracing all possible modifications and variations coming within the scope of the appended claims.

What is claimed is:

1. In a cyclically operating data processing system which provides for the concurrent performance of a plurality of tasks in a staged manner over a plurality of cycles, wherein a task may include one or more subroutines for use in performing its respective task, subroutine control means comprising:
   a multi-level return address means, one for each task, for storing return addresses for the respective task during performance thereof; and
   return address control means commonly used by said plurality of tasks and including first, second and third means which are concurrently operable during a cycle;
   said first means being operable during a cycle in response to a subroutine entry indication and a task identification indication provided by said system when a task enters a subroutine for determining a return address for the indicated subroutine,
   said second means being operable during a cycle for storing a return address determined by said first means during a previous cycle in the multi-level return address storage means of the respective task; and
   said third means being operable during a cycle in response to a subroutine entry return indication and a task identification indication provided by said system when a task arrives at the end of a routine for accessing a particular return address stored in the respective storage means of the identified task during a previous cycle for application to said system;
   said return address control means operating during a cycle to permit the determining by said first means of a return address for a first task to be performed concurrently with the storing by said second means of a return address for a second task in its respective return address storage means, and also concurrently with the accessing by said third means of a return address for a third task from its respective return address storage means for transfer to said system, said data processing system choosing the particular tasks for which said first, second and third means operate over a plurality of cycles so as to permit the tasks to time-share use of said first, second and third means for subroutine control using a staging which conforms to the staging of tasks by said system.

2. The invention in accordance with claim 1, wherein said multi-level return storage means comprises a first-in-first-out stack.

3. The invention in accordance with claim 1, wherein said return address control means provides for performing said determining, storing and accessing by said first, second and third means, respectively, for each task subroutine over a plurality of cycles, and wherein the operations performed during each cycle for a task subroutine constitutes one stage.

4. The invention in accordance with claim 1, wherein the return address storage means of each task comprises a stack for storing a plurality of return addresses, wherein a stack level pointer register is provided for each stack for storing a stack level pointer indicative of the number of return addresses stored in its respective stack, wherein said return address control means operates to store a return address in a stack at a level indicated by its respective stack level pointer, wherein said control means operates in response to said entry and return indications to maintain the stack level pointers correctly updated, and wherein said control means accesses the next most recent return address from a stack at the level indicated by the respective stack level pointer.

5. The invention in accordance with claim 4, wherein said return address control means includes means responsive to a task identification indication provided by said system for accessing from the respective stack level pointer register the respective stack level pointer value for the identified task for use by said return address control means in storing a return address at the appropriate level of the stack corresponding to the identified task.

* * * * *